US012043789B2

(12) United States Patent
Jabri et al.

(10) Patent No.: US 12,043,789 B2
(45) Date of Patent: Jul. 23, 2024

(54) FLUORESCENT BARCODED TAGS FOR DRILLING DEPTH CORRELATION

(71) Applicant: SAUDI ARABIAN OIL COMPANY, Dhahran (SA)

(72) Inventors: Nouf Jabri, Dhahran (SA); Vera Solovyeva, Moscow (RU); Alberto Marsala, Venice (IT)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 247 days.

(21) Appl. No.: 17/468,317

(22) Filed: Sep. 7, 2021

(65) Prior Publication Data

US 2023/0072620 A1   Mar. 9, 2023

(51) Int. Cl.
*E21B 49/00* (2006.01)
*C09K 8/24* (2006.01)
*C09K 11/06* (2006.01)
*E21B 47/04* (2012.01)

(52) U.S. Cl.
CPC ............. *C09K 8/24* (2013.01); *C09K 11/06* (2013.01); *E21B 47/04* (2013.01); *C09K 2211/1425* (2013.01); *C09K 2211/145* (2013.01)

(58) Field of Classification Search
CPC ......... E21B 47/11; E21B 47/04; C09K 11/06; C09K 8/24; C09K 2211/1425; C09K 2211/145
See application file for complete search history.

(56) References Cited

U.S. PATENT DOCUMENTS

| 4,609,821 A | 9/1986 | Summers |
| 2006/0131376 A1 | 6/2006 | Bargach et al. |
| 2009/0087911 A1 | 4/2009 | Ramos |
| 2010/0044034 A1 | 2/2010 | Bailey et al. |
| 2013/0109100 A1 | 5/2013 | Sarkar et al. |
| 2014/0116778 A1 | 5/2014 | Deville et al. |

(Continued)

OTHER PUBLICATIONS

Santra et al.; "Fluorescent detection of palladium species with an O-Propargylated fluorescein"; Chemical Communications; Issue 22; May 7, 2010; pp. 3964-3966 (3 pages).

(Continued)

*Primary Examiner* — Carib A Oquendo
(74) *Attorney, Agent, or Firm* — Osha Bergman Watanabe & Burton LLP

(57) ABSTRACT

A composition including a fluorescent polymer tag and an aqueous-based drilling fluid is provided. Also provided is a method of determining drill depth of recovered drill cuttings. The method includes introducing a fluorescent polymer tag into a drilling fluid, the fluorescent polymer tag includes the composition having the fluorescent compound linked to the polymer. The method then includes circulating the drilling fluid through a well during a drilling operation that creates formation cuttings such that the fluorescent polymer interacts with the formation cuttings, creating tagged cuttings. The returned cuttings are collected from the circulating drilling fluid at a surface of the well. The method then includes detecting the presence of the fluorescent polymer tag on the returned cuttings to identify the tagged cuttings, and correlating the tagged cuttings with the drill depth in the well at a time during the drilling operation.

6 Claims, 4 Drawing Sheets

(56) References Cited

U.S. PATENT DOCUMENTS

| | | |
|---|---|---|
| 2017/0234127 A1 | 8/2017 | Bartetzko et al. |
| 2018/0171782 A1 | 6/2018 | Cox et al. |
| 2019/0360326 A1 | 11/2019 | Deville et al. |
| 2020/0116019 A1 | 4/2020 | Ow et al. |
| 2021/0246365 A1* | 8/2021 | Borrell .............. G01N 33/2882 |
| 2021/0396130 A1* | 12/2021 | Trinder ................. E21B 47/12 |
| 2022/0056329 A1* | 2/2022 | AlJabri ................. C09K 11/06 |
| 2022/0112801 A1* | 4/2022 | Katterbauer ....... G01N 33/2823 |

OTHER PUBLICATIONS

O'Shea et al.; "Sequence-controlled copolymers of 2,3,4,5-pentafluorostyrene: mechanistic insight and application to organocatalysis"; Polymer Chemistry; Issue 3; Oct. 25, 2013; pp. 698-101 (4 pages).

* cited by examiner

FLUORESCENT BARCODED TAGS FOR DRILLING DEPTH CORRELATION

BACKGROUND

Drilling fluid, also referred to as "drilling mud" or simply "mud," is used to facilitate drilling boreholes into the earth, such as drilling oil and natural gas wells. The main functions of drilling fluids include providing hydrostatic pressure to prevent formation fluids from entering into the borehole, keeping the drill bit cool and clean during drilling, carrying out drill cuttings, and suspending the drill cuttings while drilling is paused and when the drilling assembly is brought in and out of the borehole. Drill cuttings, also referred to as "rock cuttings" or "formation cuttings" are rock fragments generated by the drill bit as the drill bit advances along the borehole. Mud logging is the creation of a well log of a borehole by examining the rock cuttings brought to the surface by the circulating drilling mud.

A taggant or "tag" is a chemical or physical marker added to materials to allow various forms of testing of the marked materials. The taggant can be detected using a taggant detector. A physical taggant can take many different forms but is typically microscopic in size, added to the materials at low levels, and simple to detect. The taggant may be encoded based on a specific characteristic (e.g., optical, chemical, electrical, or mechanical characteristic) to act as a virtual "fingerprint." Examples of encoded taggant include microscopic, metallic tags, e.g., between 0.3 and 1.0 millimeters, that have unique multi-digit alphanumeric identification codes. For example, the identification code may be etched into an optically variable (holographic) substrate of the tag. The tags may be suspended in a UV sensitive clear adhesive which is either brushed or sprayed onto any item for authentication or other security purposes.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a composition comprising a fluorescent polymer tag and an aqueous-based drilling fluid.

In another aspect, embodiments disclosed herein relate to a method of determining drill depth of recovered drill cuttings. The method includes introducing a fluorescent polymer tag into a drilling fluid, the fluorescent polymer tag comprising a fluorescent compound linked to a polymer. The method then includes circulating the drilling fluid through a well during a drilling operation that creates formation cuttings such that the fluorescent polymer interacts with the formation cuttings, creating tagged cuttings. The returned cuttings are collected from the circulating drilling fluid at a surface of the well. The method then includes detecting the presence of the fluorescent polymer tag on the returned cuttings to identify the tagged cuttings, and correlating the tagged cuttings with the drill depth in the well at a time during the drilling operation.

Other aspects and advantages of the claimed subject matter will be apparent from the following description and the appended claims.

DETAILED DESCRIPTION

Figure 1:
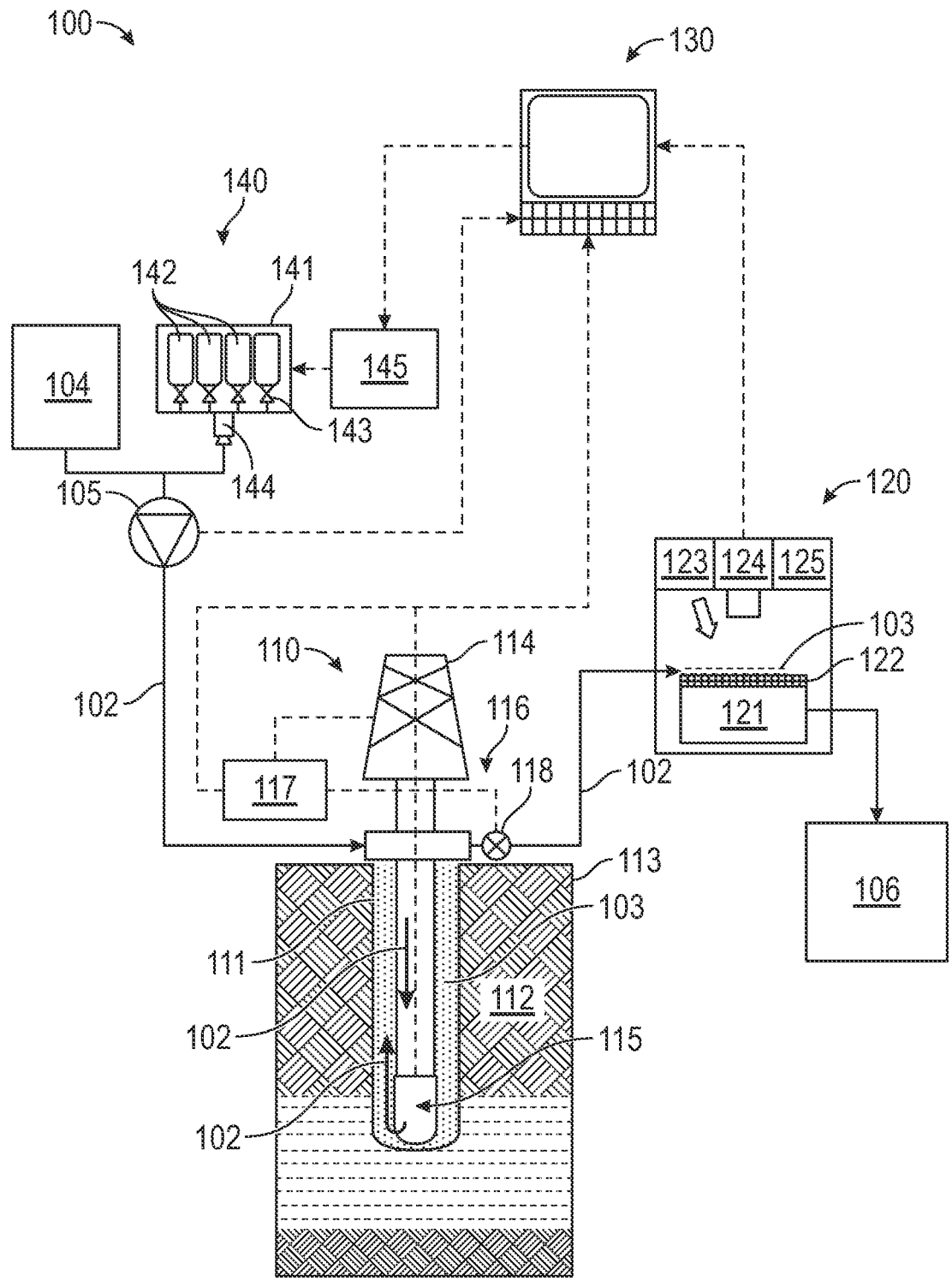
FIG. 1 shows a system according to embodiments of the present disclosure.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The present disclosure relates to a composition that includes a fluorescent polymer tag (also referred to herein as a "tag") and an aqueous-based drilling fluid. Methods for of using the composition to determine drill depth of formation cuttings are also described. Fluorescent polymer tags in accordance with one or more embodiments may be injected into the drilling fluid during drilling operations and travel downhole. Disclosed fluorescent polymer tags may interact with the formation downhole and in some instances, attach to drill cuttings produced during the drilling process. As such, drill cuttings may be "tagged" with the fluorescent polymer tags described herein. Tags having different wavelengths of fluorescent emissions, i.e., tags emitting different colors, may be controllably introduced at different drill depths. When tagged cuttings are returned to the surface via circulating drilling fluid, they can be identified based upon the fluorescence emission from the tag. This fluorescence may be correlated to an associated drilling depth, and the cuttings may be identified by the depth at which they originated. Thus, disclosed compositions may be useful for determining the drilling depth of various drill cuttings.

Drilling System

FIG. 1 shows a schematic diagram of a system 100 in which the compositions and methods disclosed herein may be used in accordance with one or more embodiments of the present disclosure. In one or more embodiments, one or more of the modules and/or elements shown in FIG. 1 may be omitted, repeated, and/or substituted. As shown in FIG. 1, the system 100 may include a well system 110, a cuttings return and detection system 120, an analysis and control system 130, and a drilling fluid tagging system 140, which may be directly and indirectly in communication with each other.

The well system 110 may include a well 111 being drilled through a subsurface formation ("formation") 112 to a hydrocarbon-bearing layer of the formation beneath the earth's surface ("surface") 113. The formation 112 may include different layers of rock having varying characteristics, such as varying degrees of permeability, porosity, capillary pressure, and resistivity. In the case of the well system 110 being operated as a production well, the well system 110 may facilitate the extraction of hydrocarbons (or "production") from the hydrocarbon-bearing layer of the formation 112 upon completion of the drilling and tagging process. As the well 111 is drilled through the formation 112, portions of the well may be cased with a casing (extending from the surface of the well) or a liner (extending downhole from an end of a previously installed casing or liner) to line the well wall. The terms "open hole," "borehole," and "wellbore" may be used interchangeably and refer to an uncased portion of a well.

In some embodiments, the well system 110 may include a rig 114 positioned above an opening to the well 111, a well sub-surface system 115, a well surface system 116, and a well control system 117. The well control system 117 may control various operations of the well system 110, such as well production operations, well drilling operations, well completion operations, well maintenance operations, and reservoir monitoring, assessment and development operations. In some embodiments, the well control system 117 may include a computer system that is the same as or similar to that of analysis and control system 130, described below in more detail.

The rig 114 may hold the equipment used to drill a borehole to form the well 111. Major components of the rig 114 may include drilling fluid tanks, drilling fluid pumps (e.g., rig mixing pumps), a derrick or mast, drawworks, a rotary table or top drive, drill string, power generation equipment and auxiliary equipment.

The well 111 may include a borehole that extends from the surface 113 into the formation 112. An upper end of the well 111, terminating at or near the surface 113, may be referred to as the "up-hole" end of the well 111, and a lower end of the well, terminating in the formation 112, may be referred to as the "downhole" end of the well 111. Drilling fluids may be circulated through the well 111 during drilling operations, including, for example, the flow of hydrocarbon production (e.g., oil and gas) from a reservoir to the surface 113 during production operations, the injection of substances (e.g., water) into the formation or reservoir during injection operations, or the communication of monitoring devices (e.g., logging tools) lowered into the well during monitoring operations (e.g., during in situ logging operations).

In some embodiments, during operation of the well system 110, the well control system 117 may collect and record well data for the well system 110. During drilling operations of the well 111, the well data may include, for example, mud properties, flow rates, drill volume and penetration rates, formation characteristics, etc. In some embodiments, the well data may be recorded in real-time, and are available for review or use within seconds, minutes or hours of the condition being sensed (e.g., the measurements are available within 1 hour of the condition being sensed). In such an embodiment, the well data may be referred to as "real-time" well data. Real-time well data may enable an operator of the well 111 to assess a relatively current state of the well system 110, and make real-time decisions regarding development of the well system 110 and the reservoir, such as on-demand adjustments in drilling fluid and regulation of production flow from the well.

In some embodiments, the well surface system 116 may include a wellhead installed at the "up-hole" end of the well, at or near where the well terminates at the surface 113, where the wellhead may include a rigid structure for supporting (or "hanging") casing and production tubing extending into the well 111. Fluid (e.g., production fluid or returning drilling fluid) directed from the well to the surface may flow through the wellhead, after exiting the well 111 and the well subsurface system 115, including, for example, casing, production tubing, a drill string, and a bottom hole assembly (including a drill bit). Such fluid may carry the disclosed fluorescent polymer tags downhole, as will be explained in greater detail below. In some embodiments, the well surface system 116 may include flow regulating devices that are operable to control the flow of substances into and out of the well 111. For example, the well surface system 116 may include one or more valves 118 that are operable to control the flow of fluid from the well 111. For example, a valve 118 may be fully opened to enable unrestricted flow of production from the well 111, the valve 118 may be partially opened to partially restrict (or "throttle") the flow of fluid from the well 111, and the valve 118 may be fully closed to fully restrict (or "block") the flow of fluid from the well 111, and through the well surface system 116.

In some embodiments, the well surface system 116 may include surface sensors for sensing characteristics of fluids passing through or otherwise located in the well surface system 116, such as pressure, temperature and flow rate of fluid (e.g., production fluid or drilling fluid) flowing through the wellhead, or other conduits of the well surface system 116, after exiting the well 111. Surface sensors may also include sensors for sensing characteristics of the rig 114 and drilling equipment, such as bit depth, hole depth, hook load, rotary speed, weight on bit, etc.

In a drilling operation, drilling fluid 102 may be pumped from a drilling fluid source 104, which may be, for example, supplied through trucks or tanks, where the drilling fluid source 104 may include a premixed drilling fluid or components provided separately that are mixed on site. In some embodiments, the drilling fluid source 104 may include used drilling fluid from a mud pit 106, which includes drilling fluid that was circulated through the well, returned to the surface and cleaned. In accordance with one or more embodiments of the present disclosure, a fluorescent polymer tag may be pumped downhole with the drilling fluid 102 and circulated through the well 111 to tag cuttings as they are formed from drilling.

Fluorescent polymer tags may be supplied from a tag injection pump 141 in the tagging system 140. The tag injection pump 141 may include a plurality of tag chambers 142, each tag chamber 142 holding a different tag and having a valve 143 positioned at a chamber outlet. A metering pump 144 may be in fluid communication with the chamber outlets of the tag chambers 142, such that when tags are released from a tag chamber 142 through the associated valve 143, the tags may be metered into the drilling fluid 102. For example, as drilling fluid 102 is pumped from the drilling fluid source 104 to the well 111, a selected tag may be released from a tag chamber 142 and metered at a selected rate through the metering pump 144.

The valves 143 and metering pump 144 may be operated and controlled using a controller 145. The controller 145 may be integrated with the tag injection pump 141 or may be remote from the tag injection pump 141. The controller 145 may send commands to the valves 143 (e.g., to open or close the valve) and the metering pump 144 (e.g., to control the speed at which the tags are metered through the pump). The controller 145 may also receive signals from the valves 143 and metering pump, for example, signals relaying status of operation. The controller 145 may send commands to implement one or more jobs designed by the analysis and control system 130. For example, the analysis and control system 130 may determine an optimized tag release operation and send instructions to the controller 145 for implementing the optimized tag release operation. The controller 145 may then send commands to one or more valves 143 and the metering pump 144 to release tags from one or more tag chambers 142 at a given speed and on a schedule according to the optimized tag release operation.

One or more pumps 105 may be used to pump the mixed tags and drilling fluid into the well 111 as the well is drilled. The drilling fluid 102 and tags may be pumped through a drill string extending through the well and out of a bottom hole assembly (e.g., through a drill bit) at an end of the drill string. When the tags are ejected out of the bottom of the drill string with the drilling fluid, the tags may attach to the formation being drilled. In some embodiments, hydraulic circulation may be the main driving force for attachment of the tags to the formation, however, the detailed interaction mechanism between the tags and formation depends on the type of tag used and may vary (e.g., chemical interaction, physical attachment, and/or electrostatic interactions). As the formation is drilled, cuttings 103 from the formation having the attached tags may be sent to the surface of the well and analyzed in the cuttings return and detection system 120.

When the drilling fluid 102 and tagged cuttings 103 are pumped to the surface of the well 111 during a drilling operation, the returned drilling fluid may be directed via one or more conduits (e.g., piping) to one or more separators 121 (sometimes referred to in the industry as shakers) in the cuttings return and detection system 120. In some embodiments, returned cuttings may automatically be directed to one or more separators 121 based on commands received from the well control system 117. A separator 121 may include, for example, one or more screens 122 arranged in the flow path of the returned drilling fluid to catch and separate cuttings 103 from the drilling fluid. For example, a separator 121 may have a screen 122 positioned laterally at an upper end of the separator 121, where returned drilling fluid may be flowed over the screen 122 after returning from the well 111. As the returned drilling fluid 102 is flowed over the screen 122, cuttings 103 in the returned drilling fluid 102 may be caught by the screen 122, while the drilling fluid 102 flows through the screen openings. In such manner, cuttings 103 brought up from drilling the well 111 may be captured and held by a screen 122 in a separator 121. In some embodiments, more than one screen and/or more than one separator may be used to separate cuttings from returned drilling fluid. In some embodiments, one or more conveyors may convey screens and/or cuttings along a path, e.g., to move cuttings to a different location for analysis.

A detection system 120 including one or more UV light sources 123 and a detection apparatus may be used to detect the presence of tags on the drill cuttings. In the embodiment shown in FIG. 1, the detection apparatus is exemplified by a camera 124. The detection apparatus is not limited to a camera, and in some embodiments, may include a UV-visible spectrometer, a mass spectrometer, a fluorescence spectrometer or a fluorometer. For exemplary purposes, embodiments having a camera as the detection apparatus are explained as follows, however, the camera may be substituted for any of the aforementioned detection systems.

In some embodiments, the UV light source 123 may be provided around the separator 121 in a position to illuminate the cuttings 103 with UV light, and the camera 124 may be positioned above the separator 121 and positioned to take pictures of the cuttings 103 when they are illuminated by the UV light. For example, as shown in FIG. 1, a UV light source 123 and a camera 124 may be held a distance above the top screen 122 of a separator 121 and positioned to face the screen 122. The UV light source 123 and the camera 124 may be positioned adjacent or proximate to each other, such that when the UV light source 123 illuminates cuttings 103 with UV light, the camera 124 may be in a position to take images of the illuminated cuttings 103. In some embodiments, the camera 124, UV light source 123, and separator 121 may be integrated into one equipment unit. In some embodiments, one or more conveyors may be used to convey the captured cuttings 103 a distance from the separator 121 to a separate detection system having at least one UV light source and a camera.

Depending on the return fluid flow rate and amount of cuttings being returned in a drilling operation, separated and captured cuttings may be moved through the separator 121 relatively quickly to allow for a continuous separation operation. To aid in a continuous separation operation, the UV light source 123 may continuously direct UV light towards the collection of cuttings, thereby continuously illuminating the cuttings, and the camera 124 may be controlled to take images of the illuminated cuttings at a rate commensurate with the speed of cutting separation and removal. In some embodiments, the UV light source 123 may be controlled to operate in coordination with the camera 124, such that operation of the UV light source 123 is timed to illuminate the collection of cuttings immediately before and during taking an image of the cuttings with the camera 124, and where the coordinated operation of both the UV light source 123 and camera 124 may be at a rate commensurate with the speed of cutting separation and removal. The camera 124 may be controlled by a timer and/or using a software program to take images at a time when the UV light source is on. For example, a camera 124 may be controlled to take a picture at an interval (e.g., every 5 minutes, every 10 minutes, or at an interval that is tied to a flow rate of returning drilling fluid measured along a flow path between the well 111 and the separator 121), while the UV light source 123 may be controlled to continuously illuminate the separated cuttings or to illuminate the separated cuttings along the same picture taking interval as the camera 124. In one or more embodiments, the camera 124 may be a UV camera or a camera having filters to capture UV light. The UV light source 123 may be sunlight or focused sunlight, in particular embodiments.

In embodiments in which a camera is used as the detection apparatus, an image processing system 125 may be used to analyze images taken by the camera 124 and identify a percentage of tagged cuttings 103 (cuttings that are illuminated an identified color under the UV light) from the total captured cuttings 103 in the image. The image processing system 125 may be provided as part of the detection system 120, for example, where the camera 124 includes software instructions to perform image analysis of the pictures it takes to identify tagged cuttings 103. In embodiments that include a detection apparatus different from a camera, a processing system associated with the detection apparatus may be used.

The detection data, including an identified amount of at least one tag color, may then be sent to the analysis and control system 130, as discussed in more detail below. In some embodiments, the image processing system 125 may be provided as part of the analysis and control system 130, where a camera 124 may send images of captured cuttings 103 to the image processing system in the analysis and control system to be processed and identify tagged cuttings 103. An image processing system 125 may analyze images in real-time, as each image is taken. For example, in some embodiments, an image processing system 125 may analyze a first image taken by a camera 124 and identify a percentage of cuttings tagged with one or more tag colors before the camera 124 takes a second image.

Any available image processing software may be used to process images taken by the camera 124 and identify an amount of at least one tag color in each image. In some embodiments, image processing software may include instructions to divide an image into discrete uniformly sized units (e.g., pixels) and compare the color in each unit. A ratio may be calculated of the different colored units, which may be used to calculate a percentage of cuttings tagged with a selected tag color (which may be captured in the image while the cuttings are illuminated by the UV light) out of the total amount of cuttings detected in the image. The drilling depth at which the formation cuttings were generated may then be determined based on the colors identified in the collected images.

Fluorescent Polymer Tag Composition

As previously described, the present disclosure relates to a composition useful for determining the drilling depth of cuttings formed during a drilling process. Compositions in accordance with one or more embodiments of the present disclosure include a fluorescent polymer tag. In one or more embodiments, the fluorescent polymer tag includes a polymer. The polymer may be any material suitable for combining with a fluorescent compound to create a fluorescent polymer tag. Thus, suitable polymers are stable under formation conditions, such as high temperature and high pressure, and are also stable in brines. Suitable polymer may also have an affinity for formation cuttings such that they may readily adhere to cuttings.

In one or more embodiments, the polymer may be selected from the group consisting of polyethylene, polyethylene glycol, polypropylene, polystyrene, polyvinylidene fluoride, polyethylene terephthalate, polyvinyl chloride, polyamide, butadiene resin, polyacrylate, polymethacrylate, polytetrafluoroethylene, phenol-formaldehyde resin, polychlorotrifluoroethylene, aramid, polychloroprene, polyisoprene, polyacrylonitrile, polyimide, polyurethane, polyether ether ketones, polypeptide, and combinations thereof. In one or more embodiments, the polymer is polystyrene.

In one or more embodiments of the present disclosure, the polymer may be in the form of a particle. The particle may have a suitable size for use as a tag. The polymer particles may have an average particle size of from about 20 to 100 nm in one or more embodiments.

Polymers in accordance with the present disclosure may have suitable properties for use in drilling fluids. For example, the polymers may be thermochemically and colloidally stable under formation conditions, such as high temperature, high pressure and high salinity. Polymers in accordance with the present disclosure are also chemically compatible with drilling fluid compositions.

In some embodiments, the chemistry of the disclosed polymers may be tuned in order to provide a high affinity for formation cuttings. For example, in one or more embodiments, polymers may be fluorinated to increase their affinity for formation cuttings. In other embodiments, a copolymer including a fluorine-containing polymer and a non-fluorine-containing polymer may be used. In an exemplary embodiment, a block copolymer of styrene and pentafluoro styrene may be used.

In accordance with one or more embodiments, the fluorescent polymer tags include a fluorescent compound. Fluorescence refers to a form of luminescence that may emit light when ultraviolet light or other electromagnetic radiation is absorbed. For example, when ultraviolet light is absorbed by a fluorescent tag, the fluorescent tag may emit visible light, which may be referred to as fluorescent light. Thus, as used herein, a fluorescent compound is a compound that emits visible light when it absorbs electromagnetic radiation. Suitable fluorescent compounds are those that emit fluorescence at a known wavelength on the spectrum of visible light (i.e., from about 400 to about 700 nanometers) and are stable under formation conditions.

Figure 2:
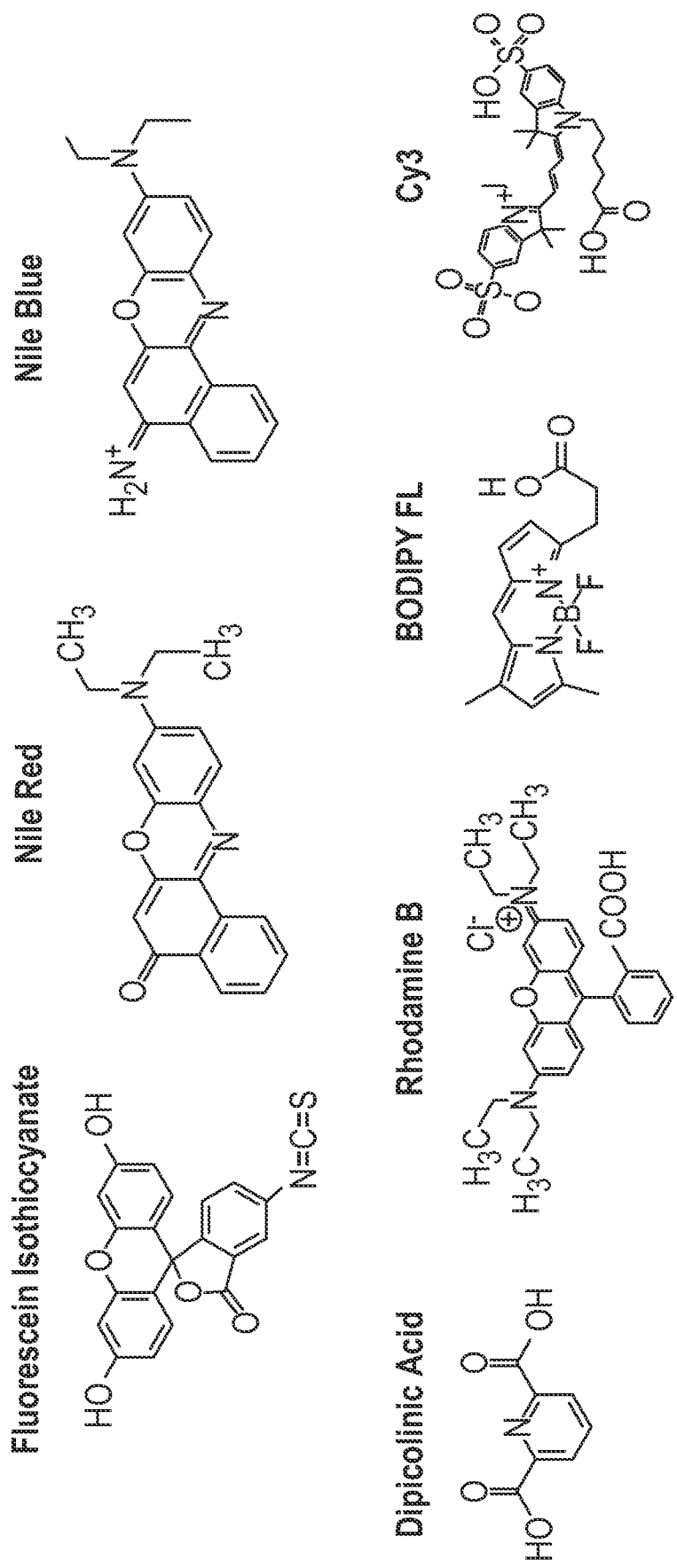
FIG. 2 shows chemical formulas of fluorescent compounds in accordance with one or more embodiments.

In one or more embodiments, the fluorescent compound is selected from the group consisting of fluorescein, fluorescein isothiocyanate, nile red, nile blue, dipicolinic acid, Rhodamine B, BODIPY FL, Cy3, and combinations thereof. Chemical formulas of these fluorescent compounds are shown in FIG. 2. The fluorescent compound is not limited to BODIPY FL and may include any dyes from the BODIPY category of dyes, which is a family of fluorescent dyes that include 4,4-difluoro-4-bora-3a,4a-diaza-5-indacene core/scaffold and various substituents that provide different colors of fluorescence. Furthermore, the fluorescent compound is not limited to Cy3 and may include any dyes from the cyanine family of dyes. Cyanines, also referred to as tetramethylindo(di)-carbocyanines, are defined as synthetic dyes with the general formula $R_2N[CH=CH]nCH=N^+R_2 \leftrightarrow R_2N^+=CH[CH=CH]_nNR_2$ in which the nitrogen and part of the conjugated chain usually form part of a heterocyclic system, such as imidazole, pyridine, pyrrole, quinoline and thiazole.

As previously described, fluorescent polymer tags in accordance with one or more embodiments include a polymer and a fluorescent compound. In some embodiments, the fluorescent compound may be covalently bonded to the polymer. In embodiments where the fluorescent compound is covalently bonded to the polymer, it may be attached to the polymer as terminating end groups.

In other embodiments, the fluorescent compound may be intercalated into the polymer structure, but not covalently bonded to the polymer. In such embodiments, the fluorescent compound may be trapped between interconnected polymeric chains. In yet other embodiments, the polymer may include fluorescent compound intercalated into the polymer structure and also fluorescent compound covalently bonded to the polymer.

Methods of Making Fluorescent Polymer Tags

The present disclosure also relates to methods of making the disclosed fluorescent polymer tags. As previously described, fluorescent compounds may be covalently bonded to the polymer, or the fluorescent compound may be intercalated into the polymer structure. In embodiments in which the fluorescent compound is covalently bonded to the polymer, a number of suitable synthesis techniques may be used to make the fluorescent polymer tag.

Figure 3:
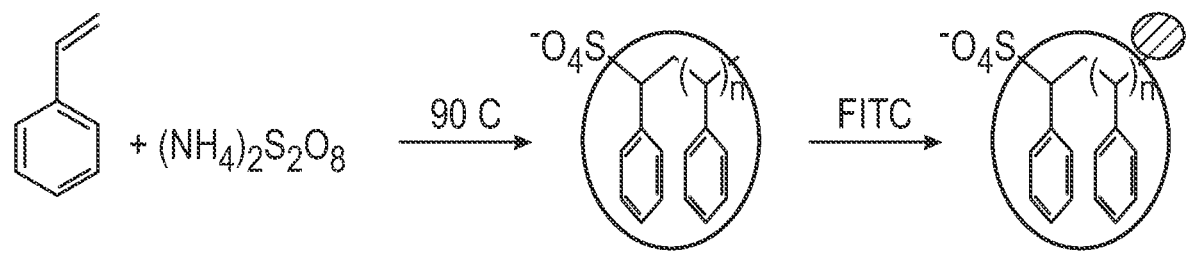
FIG. 3 shows a schematic depiction of a method of making a fluorescent polymer tag in accordance with one or more embodiments.

A schematic of an exemplary embodiment of a synthesis method is shown in FIG. 3. In the method shown in FIG. 3, the fluorescent compounds are covalently bonded as terminating groups on a styrene-based polymer. In such embodiments a monomer, such as styrene, may be mixed with water and a fluorescent compound such as fluorescein isothiocyanate. Then, a radical initiator, such as ammonium persulfate, may be added. The ammonium persulfate serves as a radical initiator which attacks the double bond on the styrene molecule to initiate the polymerization reaction. Ammonium persulfate may also serve as a catalyst in the reaction. Upon heating to 90° C. under inert atmosphere, polymerization occurs. In the embodiment shown in FIG. 3, the fluorescein isothiocyanate (FITC) may added to the polystyrene as a polymer end group.

Polymerization mechanisms are not limited to the embodiment shown in FIG. 3, and may also include methods such as step-growth polymerization, chain-growth polymerization, polycondensation, addition polymerization, anionic polymerization, free radical polymerization, cationic polymerization, controlled radical polymerization (CRP) techniques that include nitroxide-mediated polymerization (NMP), reversible addition fragmentation chain transfer (RAFT), and atom transfer radical polymerization (ATRP). Such methods are known in the art and may be selected based upon the chemical composition of the fluorescent polymer tag being synthesized.

For cationic polymerizations, initiators may include, but are not limited to, acids such as phosphoric, sulfuric, fluoro, triflic acids and others. For anionic polymerization, initiators include, but are not limited to, nucleophilic agents that include covalent or ionic metal amides, alkoxides, hydroxides, cyanides, phosphines, amines, and organometallic compounds, butyllithium, alkyllithium compounds, Grignard reagents and others. For atom transfer radical polymerization (ATRP), transition metal complexes may be used as the catalyst with an alkyl halides as initiators. RAFT agents may include, but are not limited to, thiocarbonylthio compounds, which may include but are not limited to, dithioesters, dithiocarbamates, trithiocarbonates, and xanthates. Radical initiators such as azobisisobutyronitrile (AIBN) and 4,4'-azobis(4-cyanovaleric acid) (ACVA), may also be used as the initiator RAFT polymerizations.

Figure 4:
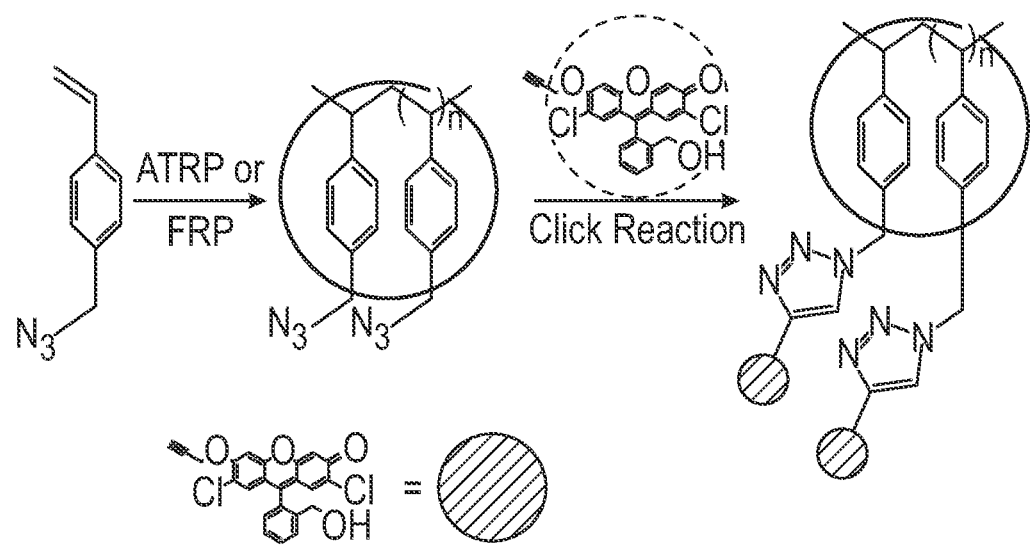
FIG. 4 shows a schematic depiction of a method of making a fluorescent polymer tag in accordance with one or more embodiments.

In one or more embodiments, a method that utilizes click-chemistry reactions may be used to covalently bond the fluorescent compound to the polymer. A schematic depiction of an exemplary embodiment of such a method is shown in FIG. 4. The method shown in FIG. 4 is analogous to procedure of copper-catalyzed azide-alkyne cycloaddition (CuAAC) can be used as synthetic method for click reactions.

In an exemplary embodiment of the method shown in FIG. 4, 4-vinylbenzyl azide may be polymerized by atom transfer radical polymerization (ATRP) or free radical polymerization (FRP), for example. These methods are as previously described. Then, click chemistry may be used to link a fluorophore to the styrene-based polymer.

In FIG. 4, a copolymer (e.g., polystyrene-poly(azidomethyl)styrene) may be dissolved in a solvent such as DMF. Propargyl fluorescein (e.g., 7.2 mmol, 1.5 eq.) and triethyl amine (TEA) (e.g., 0.97 g, 1.34 mL, 9.6 mmol, 2 eq.) may be added and the mixture dissolved. The mixture may be purified via freeze, pump, thaw cycles. Then, CuI (e.g., 91.4 mg, 0.48 mmol, 0.1 eq.) may be added under nitrogen. After an additional pumping period, the flask may be backfilled with nitrogen, thawed and placed in a 40° C. oil bath and stirred for 3 days until the reaction was complete. The reaction mixture may be purified by passing through a short column of basic alumina and subsequently dialyzed (regenerated cellulose tubing, 1000 g/mol cut-off) against a vast excess of DMF for several days to remove excess sodium propargyl sulfonate. Addition of toluene precipitates of the polymer product, which may be recovered by centrifugation, washed with DEE and dried under vacuum at room temperature. Click reactions are not limited to the embodiment described with reference to FIG. 4, and other click reactions may be used to bond the fluorescent compound to the polymer.

Figure 5:
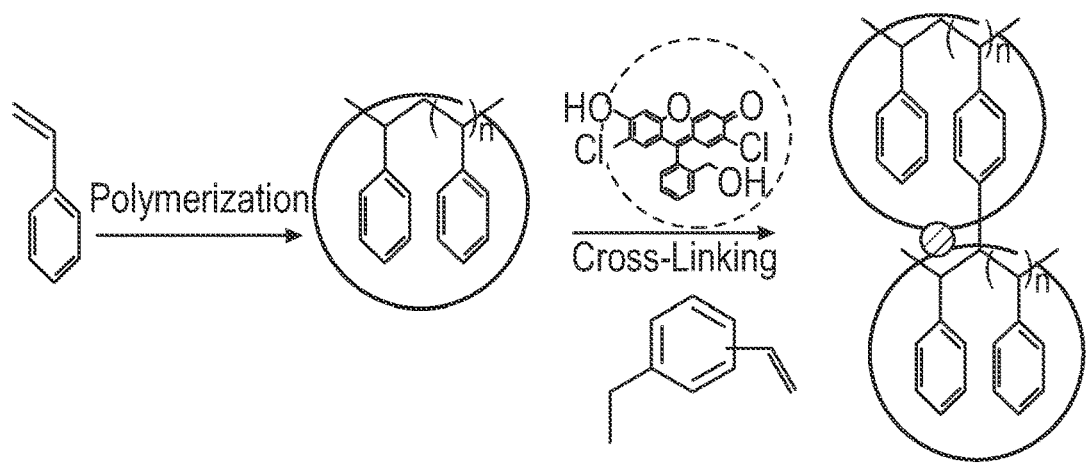
FIG. 5 shows a schematic depiction of a method of making a fluorescent polymer tag in accordance with one or more embodiments.

In embodiments in which the fluorescent compound is not covalently bonded to the polymer, but is instead intercalated into the polymer, a polymer structure may first be synthesized, and then the fluorescent compound may be intercalated into the polymer structure. A schematic of an example of such a method is shown in FIG. 5. In such embodiments, a method for making the fluorescent polymer tags includes a step of polymerizing monomers to form a polymer. Any of the previously described polymerization techniques may be used for this step.

Once a polymer, such as polystyrene, has been formed, a fluorescent compound may be introduced into a solution containing the polymer. Then, crosslinking of the polymer is done by adding 0.1 to 10 mol. % of a molecule such as divinylbenzene (relative to the amount of monomer) that will react to form a crosslinked polymer structure. Any appropriate crosslinkers known in the art may be used to create a crosslinked polymer. Upon crosslinking, the fluorescent compound remains intercalated in the crosslinked structure of the polymer.

Composition of a Drilling Fluid Including Fluorescent Polymer Tags

As previously noted, embodiments disclosed herein relate to a composition that includes a fluorescent polymer tag and an aqueous-based drilling fluid. The fluorescent polymer tag is as previously described. The fluorescent polymer tag may be added to drilling fluid so that it may be introduced into a formation during the drilling process.

One or more embodiments of the drilling fluid includes an aqueous-base fluid. The aqueous-based fluid includes water. The water may be distilled water, deionized water, tap water, fresh water from surface or subsurface sources, production water, formation water, natural and synthetic brines, brackish water, natural and synthetic sea water, black water, brown water, gray water, blue water, potable water, non-potable water, other waters, and combinations thereof, that are suitable for use in a wellbore environment. In one or more embodiments, the water used may naturally contain contaminants, such as salts, ions, minerals, organics, and combinations thereof, as long as the contaminants do not interfere with the operation of the drilling fluid.

The one or more embodiments, the drilling fluid may contain water in a range of from about 50 wt % to 97 wt % based on the total weight of the drilling fluid. In one or more embodiments, the embodiment drilling fluid may comprise greater than 70 wt % water based on the total weight of the drilling fluid.

In one or more embodiments, the water used for the embodiment drilling fluid may have an elevated level of salts or ions versus fresh water, such as salts or ions naturally-present in formation water, production water, seawater, and brines. In one or more embodiments, salts or ions are added to the water used to increase the level of a salt or ion in the water to effect certain properties, such as density of the drilling fluid or to mitigate the swelling of clays that come into contact with the drilling fluid. Without being bound by any theory, increasing the saturation of water by increasing the salt concentration or other organic compound concentration in the water may increase the density of the water, and thus, the drilling fluid. Suitable salts may include, but are not limited to, alkali metal halides, such as chlorides, hydroxides, or carboxylates. In one or more embodiments, salts included as part of the aqueous-based fluid may include salts that disassociate into ions of sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, and fluorides, and combinations thereof. Without being bound by any theory, brines may be used to create osmotic balance between the drilling fluid and portions of the subterranean formation, such as swellable clays. Salts present in aqueous-based drilling fluids may affect the electrostatic interactions between the polymers described here and the surface of tools used in drilling.

In one or more embodiments, the embodiment drilling fluid may comprise one or more salts in an amount that ranges from about 1 to about 300 ppb (pounds per barrel). For example, the drilling fluid may contain the one or more salts in an amount ranging from a lower limit of any of 1, 10, 50, 80, 100, 120, 150, 180, 200, 250 and 280 ppb, to an upper limit of any of 20, 30, 40, 50, 70, 100, 120, 150, 180, 200, 220, 240, 260, 280 and 300 ppb, where any lower limit can be used in combination with any mathematically-compatible upper limit.

In one or more embodiments, the embodiment drilling fluid may include at least one pH adjuster. The pH adjuster may be at least one alkali compound. Examples of alkali compounds may include, but are not limited to, lime (calcium hydroxide, calcium oxide, or a mixture thereof), soda ash (sodium carbonate), sodium hydroxide, potassium hydroxide, and combinations thereof. The alkali compounds may react with gases, such as $CO_2$ or $H_2S$ (also known as acid gases), encountered by the drilling fluid composition during drilling operations and prevent the gases from hydrolyzing components of the drilling fluid composition. Some embodiment drilling fluid compositions may include a pH adjuster in a range of from about 0.01 wt % to about 0.7 wt %, such as from 0.01 wt % to 0.5 wt %, from 0.01 wt % to 0.3 wt %, from 0.01 wt % to 0.1 wt %, from 0.01 wt % to 0.05 wt %, from 0.05 wt % to 0.7 wt %, from 0.05 wt % to 0.5 wt %, from 0.05 wt % to 0.3 wt %, from 0.05 wt % to 0.1 wt %, from 0.1 wt % to 0.7 wt %, from 0.1 wt % to 0.5 wt %, from 0.1 wt % to 0.3 wt %, from 0.3 wt % to 0.7 wt %, from 0.3 wt % to 0.5 wt %, and from 0.5 wt % to 0.7 wt % pH adjuster, based on the total weight of the drilling fluid composition. In one or more embodiments, the drilling fluid compositions may optionally include from 0.01 ppb to 10 ppb of at least one pH adjuster based on the total volume of the drilling fluid composition.

Embodiment drilling fluids may have a neutral or alkaline pH. In one or more embodiments, the drilling fluid may have a pH ranging from about 7, 7.5, 8, 8.5, 9, 9.5, and 10, to about 7.5, 8, 8.5, 9, 9.5, 10, 10.5, and 11, where any lower limit may be combined with any mathematically feasible upper limit.

In one or more embodiments, the embodiment drilling fluid may include weighting agents, which may be dispersed in the drilling fluid. The solids may be finely divided and have a specific gravity (SG) that when added to an aqueous-based fluid increases the density of the drilling fluid. Examples of suitable weighting materials include, but are not limited to, barite (minimum SG of 4.20), hematite (minimum SG of 5.05), calcium carbonate (minimum SG of 2.7-2.8), siderite (minimum SG of 3.8), ilmenite (minimum SG of 4.6), magnesium tetroxide (minimum SG of 4.8), and combinations thereof.

The embodiment drilling fluid may include an amount of weighting material sufficient to increase the density of the drilling fluid composition to support the wellbore and prevent fluid intrusion. In one or more embodiments, the drilling fluid composition may include weighting material in a range of from about 1 wt % to about 30 wt % based on the total weight of the drilling fluid composition. For example, the drilling fluid may contain weighting agents in an amount ranging from about 1 ppb to about 700 ppb, such as from about 10 to about 650 ppb, from about 50 ppb to about 700 ppb, or from about 100 ppb to about 600 ppb, or from about 200 ppb to about 500 ppb.

In one or more embodiments, the drilling fluid may have a density in a range of from about 62 pounds cubic foot (pcf) to about 170 pcf as measured using Fann Model 140 Mud Balance according to ASTM Standard D4380. For instance, the drilling fluid may have a density in a range of from about 63 pcf to about 150 pcf, from 65 pcf to 140 pcf, from 70 pcf to 160 pcf, from 80 pcf to 150 pcf, from 90 pcf to 140 pcf, from 100 pcf to 160 pcf, from 70 pcf to 150 pcf, from 70 pcf to 100 pcf, and from 120 pcf to 160 pcf. The drilling fluid may have a density that is greater than or equal to 62 pcf, such as greater than or equal to 70 pcf, and such as greater than or equal to 100 pcf.

In one or more embodiments, the drilling fluid may include a suitable amount of the fluorescent polymer tags for delivering the tags downhole to the formation. The amount of fluorescent polymer tags may be adjusted depending on the type of fluorescent polymer tag used. In one or more embodiments, the drilling fluid may include from about 5 to 200 ppm (parts per million) of the fluorescent polymer tag. The drilling fluid may include a lower limit of one of 5, 10, 20, 30, 50, and 75 ppm and an upper limit of one of 100, 125, 150, 175 and 200 ppm where any lower limit may be paired with any mathematically compatible upper limit.

Method of Correlating Recovered Drill Cuttings to Drilling Depth

Figure 6:
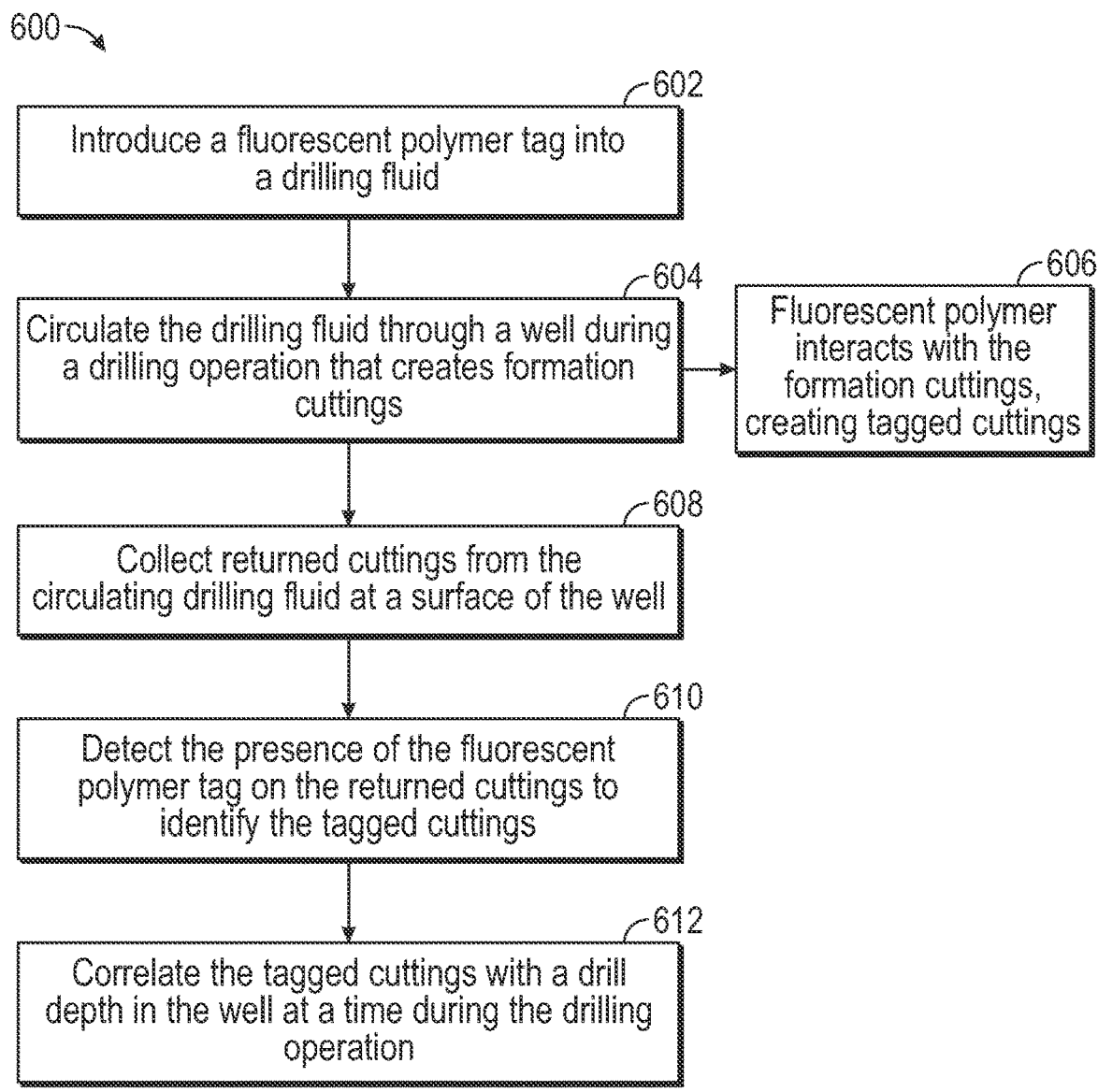
FIG. 6 shows a block flow diagram of a method in accordance with one or more embodiments of the present disclosure.

One or more embodiments of the present disclosure relate to methods of using the disclosed fluorescent polymer tags to determine the drill depth of drill cuttings. An exemplary method 600 is shown in FIG. 6. The method 600 shown in FIG. 6 includes introducing a fluorescent polymer tag into a drilling fluid, the fluorescent polymer tag comprising a fluorescent compound linked to a polymer 602. The fluorescent polymer tag may be introduced via the previously described tagging system 140. A tag having a particular fluorescence emission wavelength may be introduced at a known drill depth.

After the tag has been introduced into the drilling fluid, the drilling fluid is circulated through a well during a drilling operation that creates formation cuttings 604. During the process of circulating the drilling fluid as formation cuttings are created, the fluorescent polymer interacts with the formation cuttings, creating tagged cuttings 606. The fluorescent polymer tag may adhere to the surface of the drill cuttings via electrostatic interactions and/or it may be impregnated in the drill cuttings. Tags that are impregnated in the drill cuttings may be lodged in the pores of the drill cuttings so that they effectively adhere to the cuttings.

As drilling fluid is circulated in the well, cuttings, including tagged cuttings, are returned to the surface of the well in the circulating fluid. The method 600 includes collecting these returned cuttings from the circulating drilling fluid at a surface of the well 608. The cuttings may be collected via the previously described cuttings return and detection system 120.

Once returned drill cuttings are collected, the presence of the fluorescent polymer tag is detected on the returned cuttings to identify the tagged cuttings 610. The presence of the fluorescent polymer tag may be detected via any suitable detection methods, such as, for example, ultraviolet-visible (UV-Vis) spectroscopy, gas chromatography-mass spectrometry, gel permeation chromatography, mass spectrometry, and fluorometry. In some embodiments, the detection method may include illuminating the tagged cuttings with UV light and obtaining images of the cuttings with a camera.

The method 600 then includes correlating the tagged cuttings with a drill depth in the well at a time during the drilling operation 612. The correlation may be made by identifying the fluorescence of the tagged cuttings and associating the fluorescent with a tag that was introduced at a given time. The time at which a particular tag was introduced is associated with a given drill depth.

In one or more embodiments, multiple tags may be used to determine depth of cuttings at different times during the drilling operation. In such embodiments, after the previously described steps, a second fluorescent polymer tag is pumped with the drilling fluid down the well. In such embodiments, the second fluorescent polymer tag is configured to attach to and tag formation cuttings as the well is drilled. During the drilling operation, the drill cuttings are returned to the surface of the well as the drilling fluid is circulated, and the presence of the second fluorescent polymer tag is detected on the tagged cuttings.

In one or more embodiments, the first fluorescent polymer tag comprises a first emission wavelength, and the second fluorescent polymer tag comprises a second emission wavelength. The first emission wavelength is different from the second emission wavelength such that the first polymer fluorescent polymer tag may be differentiated from the second fluorescent polymer tag using at least one of ultraviolet spectroscopy, gas chromatography-mass spectrometry, and gel permeation chromatography. As will be appreciated by those skilled in the art, any number of different fluorescent polymer tags may be used at different depths during the drilling process. The fluorescent polymer tags may be chosen based on their emission wavelength such that they may be differentiated from one another using any of the aforementioned detection methods.

In one or more embodiments, the method may further include, prior to introducing the fluorescent polymer tag into the drilling fluid, covalently bonding a fluorescent compound to a polymer to form the fluorescent polymer tag. The fluorescent compound may be covalently bonded to the polymer using the previously described methods. In one or more embodiments, they may be covalently bonded via a click reaction.

In other embodiments, the method may further include intercalating a fluorescent compound into a polymer structure to form the fluorescent polymer tag. The fluorescent compound may be intercalated into the polymer using the previously described methods.

Embodiments of the present disclosure may provide at least one of the following advantages. The disclosed compositions and methods may allow for more precise depth determination of drill cuttings in real time during drilling operations as compared to conventional methods of analyzing drill cuttings. In one or more embodiments, analysis may be performed rapidly on-site, rather than transporting samples to a laboratory for analysis.

EXAMPLES

Materials used in the examples are shown in Table 1.

TABLE 1

| Name and Abbreviation | Molecular Formula | Supplier | Purity |
|---|---|---|---|
| 2,7-Dichlorofluorescein Diacetate (DCFH) | $C_{24}H_{16}Cl_2O_7$ | Thermo Fisher | 97% |
| Potassium carbonate | $K_2CO_3$ | Thermo Fisher | 99% |
| Dimethylformamide (DMF) | $C_3H_7NO$ | Thermo Fisher | HPLC grade |
| Diisobutylaluminium hydride (DIBAL-H) | $C_8H_{19}Al$ | Thermo Fisher | 99% |
| Dichloromethane (DCM) | $CH_2Cl_2$ | Thermo Fisher | HPLC grade |
| 2,3-Dichloro-5,6-dicyano-1,4-benzoquinone (DDQ) | $C_8Cl_2N_2O_2$ | ACROS | 98% |
| Ether (EtH) | $(C_2H_5)_2O$ | Sigma Aldrich | 98% |
| poly(azidomethyl)styrene | — | Can be synthesized in the lab | Can be synthesized in the lab |
| Copper(I) iodide | CuI | Sigma Aldrich | 99.99% |
| diethyl ether ($Et_2O$) | $(C_2H_5)_2O$ | Sigma Aldrich | 99% |
| pad of basic alumina oxide | $Al_2O_3$ | Honeywell Fluka | 99.90% |

Example 1: Synthesis of O-Propargyl Fluorescein

O-Propargyl fluorescein was obtained from the commercial 2',7'-dichlorofluorescein in two steps. To a solution of fluorescein 3 (500 mg, 1.25 mmol) in DMF (10 mL) was added $K_2CO_3$ (430 mg, 3.1 mmol) portionwise at 25° C. under an argon atmosphere. To the mixture was added propargyl bromide (370 mg, 3.1 mmol) was added dropwise for 10 min. Then, the reaction mixture was heated to 60° C. for 6 h, and it was cooled to room temperature and poured into ice-water. The resulting precipitate was filtered and washed with water (100 mL) and then with hexane (100 mL). The dark orange solid was dried in atmosphere. The resultant product was 2-[2,7-dichloro-3-oxo-6-(prop-2-ynyloxy)-3H-xanthen-9-yl]benzoic acid prop-2-ynyl ester.

Then, the 2-[2,7-dichloro-3-oxo-6-(prop-2-ynyloxy)-3H-xanthen-9-yl]benzoic acid prop-2-ynyl ester (240 mg, 0.50 mmol) in $CH_2Cl_2$ (10 mL) was added a solution of DIBALH (2.01 mL, 1.0 M in hexanes) dropwise over 15 min at −78° C. under an argon atmosphere. The resulting solution was stirred for 10-15 min at the same temperature, and then it was warmed to 25° C. and stirred for 3 h. The reaction mixture was cooled to 0° C., diluted with $Et_2O$ (10 mL), and quenched with saturated aqueous $NH_4Cl$ (2 mL). The solution was warmed to 25° C. and stirred for 1 h. The reaction mixture was then diluted with Et$_2$O (20 mL) and treated with DDQ (114 mg, 0.50 mmol) at 0° C. After being stirred for 2 h at 25° C., the mixture was filtered through a pad of Celite® and the pad was washed with EtOAc (50 mL). The filtrate was dried over Na$_2$SO$_4$, and the solvents were evaporated in vacuo. Silica gel flash chromatography of the residue (10% EtOAc in hexanes) afforded product 1 as a pale yellow solid. The resultant product was O-Propargyl fluorescein.

Example 2: Azide-Alkyne Cycloaddition 5 mmol of poly(azidomethyl)styrene was dissolved in 10 ml of dry DMF in a Schlenk tube. 7.5 mmol of propargyl fluorescein as synthesized in example 1 and 9.6 mmol of triethylamine were added to the reaction mixture. The mixture was subject to 3 freeze, pump, thaw cycles. On the fourth freeze, 0.48 mmol of CuI (0.1 eq.) was added under inert atmosphere. After an additional pumping step, the flask was backfilled with nitrogen and placed into preheated oil bath at a temperature of 40-50° C. for 3 days under constant stirring.

Completion of the reaction was monitored by FTIR analysis of aliquots from the reaction mixture precipitated with diethyl ether by disappearance of the azide peak at 2100 cm$^{-1}$. After completion of the reaction, the reaction mixture was passed through a pad of basic alumina oxide and dialyzed against excess of DMF for several days followed by precipitation of the product with toluene. The product was recovered by centrifugation, washed with diethyl ether, and dried under vacuum. The resultant product was an orange-red powder. An aqueous solution of the final product may be used as a tag in drilling fluids. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A composition of matter comprising:
    a fluorescent polymer tag;
    an aqueous-based drilling fluid; and
    a plurality of formation cuttings, wherein the fluorescent polymer tag is impregnated into or electrostatically interacting with the formation cuttings,
    wherein the polymer is in the form of a particle having an average size of from about 20 to 100 nm.

2. The composition of claim 1, wherein the fluorescent polymer tag comprises a polymer selected from the group consisting of polyethylene, polyethylene glycol, polypropylene, polystyrene, polyvinylidene fluoride, polyethylene terephthalate, polyvinyl chloride, polyamide, butadiene resin, polyacrylate, polymethacrylate, polytetrafluoroethylene, phenol-formaldehyde resins, polychlorotrifluoroethylene, aramid, polychloroprene, polyisoprene, polyacrylonitrile, polyimide, polyurethane, polyether ether ketone, polypeptide, and combinations thereof.

3. The composition of claim 2, wherein the polymer is polystyrene.

4. The composition of claim 1, wherein the fluorescent polymer tag comprises a fluorescent compound selected from the group consisting of fluorescein isothiocyanate, nile red, dipicolinic acid, Rhodamine B, Nile Blue, BODIPY FL, Cy3, and combinations thereof.

5. The composition of claim 1, wherein the fluorescent polymer tag comprises a fluorescent compound covalently bonded to a polymer structure.

6. The composition of claim 1, wherein the fluorescent polymer tag comprises a fluorescent compound intercalated into a crosslinked polymer structure.

* * * * *